United States Patent [19]

Rattlingourd

[11] 4,208,724

[45] Jun. 17, 1980

[54] SYSTEM AND METHOD FOR CLOCKING DATA BETWEEN A REMOTE UNIT AND A LOCAL UNIT

[75] Inventor: Glen D. Rattlingourd, Salt Lake City, Utah

[73] Assignee: Sperry Corporation, New York, N.Y.

[21] Appl. No.: 842,639

[22] Filed: Oct. 17, 1977

[51] Int. Cl.² .................. G06F 1/04; G11C 9/00; H03K 5/13; H04L 7/00

[52] U.S. Cl. .................. 364/900; 307/269; 375/118

[58] Field of Search ... 364/900 MS File, 200 MS File; 178/69.1, 53; 307/208, 210, 269; 328/63, 72, 155, 179; 179/15 BS

[56] References Cited

U.S. PATENT DOCUMENTS

| | | | |
|---|---|---|---|
| 3,500,330 | 3/1970 | Hertz | 364/900 |
| 3,577,128 | 5/1971 | Criscimagna | 364/200 |
| 3,602,900 | 8/1971 | Delaigue et al. | 364/200 |
| 3,654,492 | 4/1972 | Clark | 307/269 |
| 3,668,315 | 6/1972 | Heitzman | 178/69.1 |
| 3,671,776 | 6/1972 | Houston | 307/269 |
| 3,745,248 | 7/1973 | Gibson | 178/69.1 |
| 3,746,800 | 7/1973 | Stuart | 178/69.1 |
| 3,755,748 | 8/1973 | Carlow et al. | 328/155 |
| 3,804,982 | 4/1974 | Brown | 178/69.1 |
| 3,867,579 | 2/1975 | Colton et al. | 364/900 X |
| 3,878,334 | 4/1975 | Halpern | 178/69.1 |
| 3,898,388 | 8/1975 | Goodwin | 179/15 BS |
| 3,928,727 | 12/1975 | Roche | 179/15 BS |
| 3,967,060 | 6/1976 | Subramanian | 178/69.1 |
| 3,974,333 | 8/1976 | May, Jr. et al. | 178/69.1 |
| 3,992,581 | 11/1976 | Davis | 178/69.1 X |
| 4,015,083 | 3/1977 | Bellisio | 178/69.1 |
| 4,034,352 | 7/1977 | Hotchkiss | 364/200 |
| 4,045,613 | 8/1977 | Walker | 178/53 X |
| 4,065,862 | 1/1978 | Meyer | 364/200 |
| 4,085,288 | 4/1978 | Viswanathan | 178/69.1 |

*Primary Examiner*—Melvin B. Chapnick
*Attorney, Agent, or Firm*—John P. Dority; William E. Cleaver; Marshall M. Truex

[57] ABSTRACT

An automatic clock phase adjustment circuit is incorporated in a local unit of a data clocking system. The local unit also includes a clock pulse generator and a local data storage device. The system also includes a remote unit having a remote data storage device. The automatic clock phase adjustment circuit receives clock pulses from the generator and produces output clock pulses having first and second half periods interconnected by a clocking transition which when applied to the remote storage device causes clocking out of data to the local storage device. The circuit also produces a sampling pulse during each of the first and second half periods of the output clock pulses and is operable to detect in which particular one of the half periods a positive transition in the incoming data has occurred during the interval of a sampling pulse in that half period. This permits the circuit to produce local or input clock pulses for clocking in the incoming data at the local storage device during the other of the half periods so that the clocking edges of the input clock pulses will not coincide with any of the positive transitions of the incoming data when applied to the local storage device. As a result, reliable storage of the incoming data is guaranteed to occur at the local storage device at times when the data is stable.

11 Claims, 5 Drawing Figures

SYSTEM AND METHOD FOR CLOCKING DATA BETWEEN A REMOTE UNIT AND A LOCAL UNIT

BACKGROUND OF THE INVENTION

1. Field of the Invention

The present invention broadly relates to a data clocking system and, more particularly, is concerned with an automatic clock phase adjustment method and circuit for use in the data clocking system to insure that reliable storage of data that has been delayed by an unknown amount is achieved.

2. Description of the Prior Art

One prior art data clocking system includes a local unit and a remote unit being interconnected by clock sending and data receiving cables or the like. The local unit includes a clock pulse generator and a local data storage device, while the remote unit includes a remote data storage device. The purpose of the system is to clock out the data from the remote storage device, the data having been received at the remote storage device from some other source, and clock in that data to the local storage device and by so doing transfer the data to a local multiplexer or some other data utilization unit. Thus, in operation, clock pulses generated by the local generator are sent from the local unit on one cable to the remote data storage device for clocking out digital data from the remote device through the outer cable to the local data storage device. Concurrently, clock pulses are applied from the generator to the local storage device for clocking in or transferring the incoming data through the latter to the local data utilization unit.

In situations where digital data is being clocked from the remote unit at high rates, such as 10 to 60 MHz., clock and data propagation delays are to be expected due to variations in cable length and temperature as well as inherent characteristics of electrical circuit components. Under conditions where the sum of such delays approximately equals the closk pulse period or multiples thereof, data will not be clocked in properly at the local storage unit. This is because the clocking edge of the clock pulse being applied to the local data storage device will coincide in time with a transition in the data at the local device. This condition produces unreliable data storage or transfer at the local storage device, which ordinarily results in the loss of that particular portion of the data.

For avoiding this condition, the prior art practice has been to manually adjust or shift the phase of the clock pulses being clocked to the remote unit to insure that incoming data transitions will not coincide with the clocking edge of the clock pulses applied to the local storage device. One way that the phase of the outgoing or output clock pulses may be adjusted is by changing the length of one of the cables relative to the other such as by having several jumper cables of varying lengths so that one can be substituted for another each time a phase adjustment needs to be made. Another way is by using a one-shot multivibrator interconnected between the generator and the clock sending cable which may be manually adjusted to vary the timing of the output clock pulses. Conversely, either of these methods could be utilized to adjust the timing of the local clock pulses to the local storage device in relation to the timing of the output clock pulses.

However, these prior art methods have several disadvantages. They both require manual adjustment and continued operator attention to maintain the correct adjustment. Manual adjustment is oftentimes not feasible because it takes too much time and dramatically reduces the operating efficiency of the system. Also, because the system is often being used in environments where space limitations require extreme compactness in the installation of the equipment, such as on aircraft, it is very inconvenient and different to make the necessary manual adjustments.

SUMMARY OF THE INVENTION

The present invention obviates the foregoing disadvantages of the prior art by providing a clock phase adjustment method and circuit which permits automatic detection of the transition areas in the digital data being clocked from the remote unit and selection of proper clock phase or timing in relationship to the data transition areas so that clocking in of the data at the local unit will occur at times when the data is stable. Although the circuit somewhat increases the cost of the overall system, this is more than compensated for in the enhancement of operating efficiency of the system by the circuit. Clock phase adjustments are accomplished at speeds compatible with the high rates of data and clock propagation. The circuit may be easily constructed from commercially available electronic components.

Accordingly, the present invention provides an automatic clock phase adjustment method and circuit means which: (a) produce output clock pulses which each have first and second period portions and a transition for causing the clocking out of data from a remote unit; (b) define a sample area in each of the period portions which is of shorter duration than its respective period portion; (c) monitor the data for determining in which one of the period portions a transition in the data occurs during a sample area; and (d) produce input clock pulses during the sample area in the other of the period portions for clocking in of the data to a local unit. More particularly, the method and circuit means provide for storing an indication of in which one of the period portions a transition in the data most recently occurred during a sample area and for selecting the other of the period portions for clocking in of data to the local unit.

The present invention also provides in a data clocking system having a local data storage device and a remote data storage device being connected to the local storage device, a method and circuit means for accomplishing automatic clock phase adjustment which comprises: (a) producing output clock pulses with each having a predetermined period being comprised of first and second half periods interconnected by a clocking transition which when applied to the remote data storage device causes clocking unit of data therefrom to the local data storage device; (b) producing a sampling pulse during each of the first and second half periods of the output clock pulses with each of the sampling pulses having an interval of shorter duration than its corresponding half period of the output clock pulse; (c) producing timing pulses with each having a transition which occurs approximately at the middle of the interval of each of the sampling pulses; (d) receiving the output clock pulses and the sampling pulses and monitoring the data as the latter is clocked to the local storage device for detecting the one of the first and second half periods of the output clock pulses in which the coincidence of a transition of the data with one of the sampling pulses occurs; and (e) producing input clock pulses in response to the transitions of the timing pulses occurring at the middle of the intervals of sampling pulses which occur during the other of the first and second half periods of the output clock pulses for clocking in of the data to the local data storage device. The respective sampling pulses being produced during the first and second half periods of the output clock pulses are located between and displaced inwardly from the opposite ends of the corresponding half periods.

DETAILED DESCRIPTION OF THE INVENTION

Prior Art System

Figure 1:
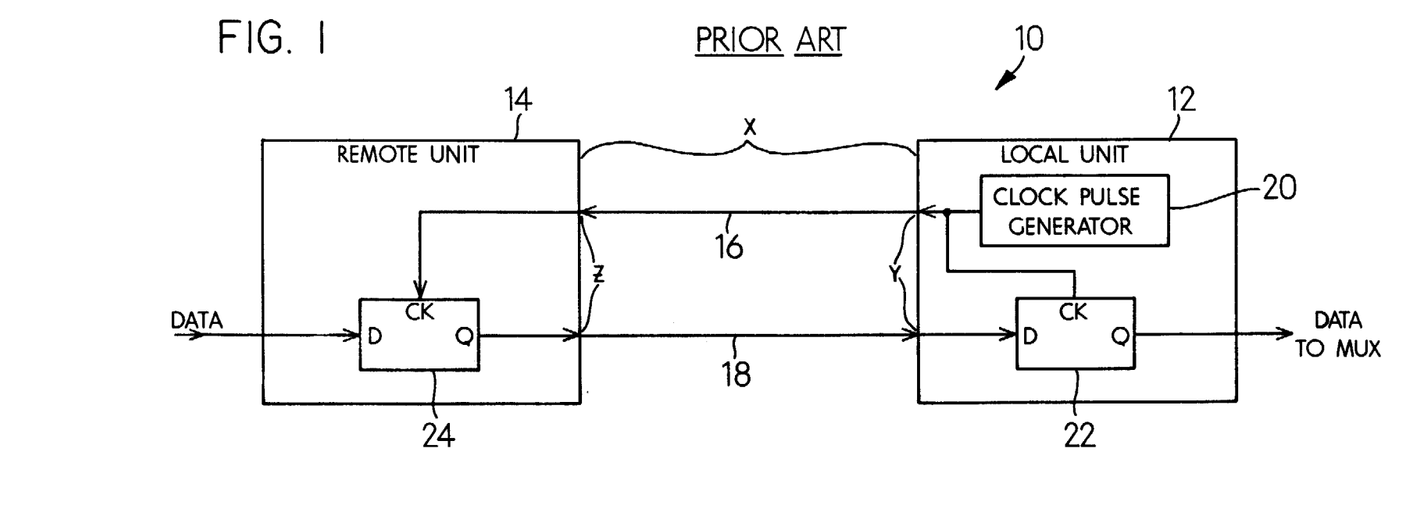
FIG. 1 is a block diagram of the prior art data clocking system.

Referring first to FIG. 1, there is illustrated a prior art data clocking system, generally designated 10, comprised by a local unit 12 and a remote unit 14 being interconnected by clock sending and data receiving cables 16 and 18, each of the latter being of the same length X, for example 100 feet (approximately 30.5 meters). The local unit 12 includes a clock pulse generator 20 and a local data storage device 22, such as a flip-flop. The remote unit 14 includes a remote data storage device 24, which may also be a flip-flop.

In operation, clock pulses generated by the clock pulse generator 20 are sent from the local unit 12 on the cable 16 to the remote data storage device 24 of the remote unit 14 for clocking out digital data from the device 24 through cable 18 to the local data storage device 22 in the local unit 12. Concurrently, the clock pulses are applied from the generator 20 to the local storage device 22 for transferring or clocking in data through the latter to a local multiplexer unit (not shown) or some other data utilization component.

In situations where digital data is being clocked from the remote unit at high rates, such as 10 to 60 MHz., clock and data propagation delays are to be expected due to variations in cable length and temperature as well as inherent characteristics of electrical circuit components. Under conditions where the sum of such delays approximately equals the clock pulse period or integer periods, data will not be stored properly in the local storage device 22.

Figure 2:
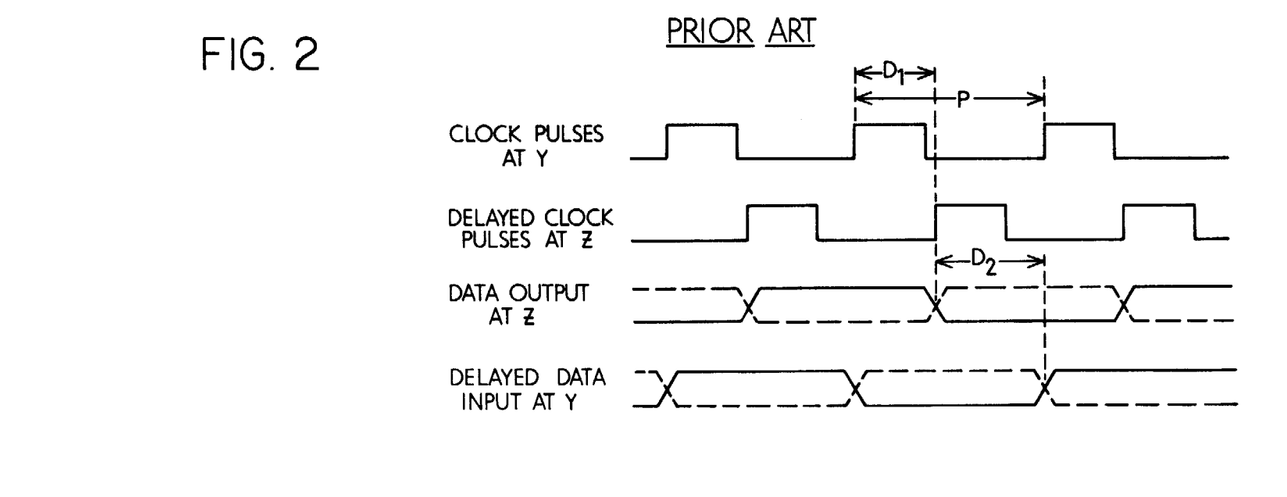
FIG. 2 is a timing diagram useful in explaining the problem associated with the prior art system of FIG. 1.

FIG. 2 illustrates the aforementioned condition where timing or phase delays in clock and data propagation are approximately equal to the period P of the clock pulse produced by the generator 20. Clock Pulses At Y represent the timing of the clock pulses as they leave the local unit 12 on the cable 16 and also as they are applied to the CK input of the local storage device 22 for causing the transfer of data from the D input to the Q output of the device 22 (and thus to the local multiplexer unit). Delayed Clock Pulses At Z represent the timing relationship of the clock pulses as they arrive at the remote unit 14 from propagation on the cable 16 and are applied to the CK input of the remote storage device 24 for causing the transfer of data from the D input to the Q output of the device 24. By comparing the Clock Pulses At Y with the Delayed Clock Pulses At Z, one can readily see that the latter are delayed by a time duration $D_1$ relative to the former.

When the Delayed Clock Pulses At Z are applied to the CK input of the remote storage device 24, data bits are transferred or clocked out at the Q output of the device 24 and have the timing relationship represented by Data Output At Z in FIG. 2. When this data arrives at the local storage device 22, from propagation on the cable 18, for clocking through to the Q output of the device 22, the data has the timing relationship as represented by Delayed Data Input At Y of FIG. 2. By comparing the Data Output At Z with the Delayed Data Input At Y, one can readily see that the latter is delayed by a time duration $D_2$ relative to the former.

In the condition represented in FIG. 2, the sum of the clock delay $D_1$ and the data delay $D_2$ approximately equals the period P of the clock pulse such that just when the leading edge of the clock pulse is being applied to the CK input of the local storage device 22 for causing the transfer of the data being felt at the D input of the device 22 to its Q output, the data is undergoing a transition, either from low to high shown in solid line or high to low shown in broken line. This condition produces unreliable data storage or transfer at the local storage device 22, ordinarily resulting in the loss of that particular data bit.

For avoiding this condition, the prior art practice has been to manually adjust or shift the phase of the clock pulses being clocked to the remote unit 14 to insure that data transitions will not coincide with the leading or clocking edges of the clock pulses applied to the local storage device 22. The particular forms such prior art practice has taken to achieve the clock pulse phase shift and the problems associated with each have been described hereinabove.

Automatic Clock Phase Adjustment Circuit

Figure 3:
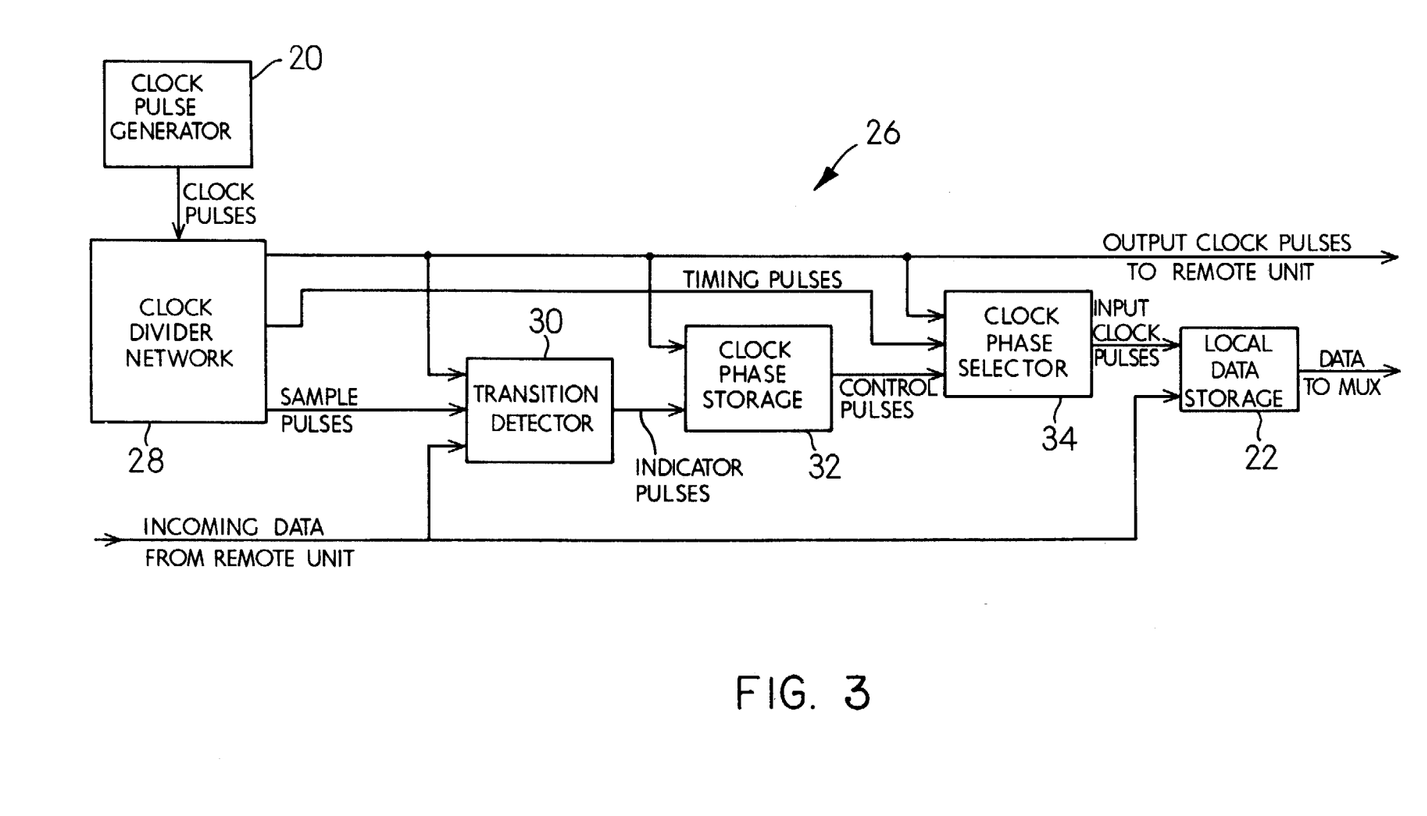
FIG. 3 is a clock system diagram of the automatic clock phase adjustment circuit of the present invention.

Turning now to FIG. 3, there is illustrated the automatic clock phase adjustment circuit of the present invention in block form, being designated generally by the numeral 26. The circuit 26 permits detection of the transition areas in the digital data being clocked from the remote unit and selection of proper clock phase or timing in relationship to the data transition areas so that the leading edges of the clock pulses when applied to the local storage device 22 do not occur or coincide with any of such transitions and thereby produce unreliable data storage when the data arrives at the local unit 12. The detection of the data transition areas and selection of the proper clock phase are done by the circuit 26 automatically. Thus, reliable storage of data that has been delayed by an unknown amount is achieved since clocking at the local unit 12 is guaranteed to occur at a time when the data is stable (not in a transitional state).

Figure 4:
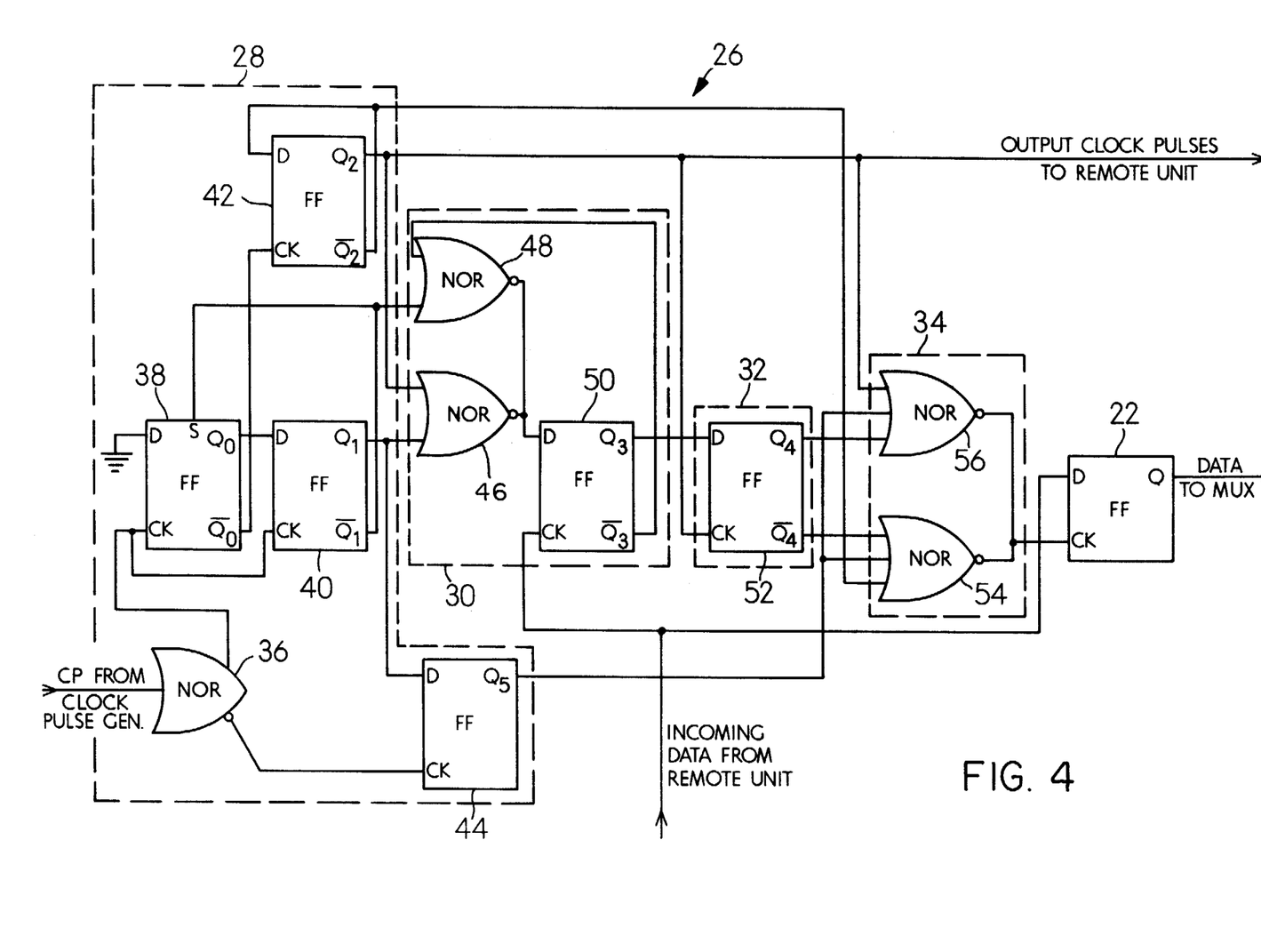
FIG. 4 is a detailed electrical schematic diagram of the circuit embodying the present invention.

As generally depicted in FIG. 3, and illustrated in detail in FIG. 4, the automatic clock phase adjustment circuit 26 includes a clock divider network 28, a data transition detector 30, a clock phase storage 32 and a clock phase selector 34. The circuit 26 is located in the local unit 12. The clock divider network 28 of the circuit 26 recieves clock pulses from the clock pulse generator 20 and at one output produces clock pulses which are sent to the remote unit 14 on the cable 16 for clocking out data from the remote storage device 24 to the local storage device 22. The data transition detector 30 of the circuit 26 monitors the data coming in from the remote unit 14 to the local storage device 22 for detecting transition areas in the data. The clock phase selector 34 of the circuit 26 outputs the local or input clock pulses which cause the incoming data received by the local storage device 22 to be transferred through to the local multiplexer unit or some other data utilization component.

More particularly, the output clock pulses produced by the network 28 each have a predetermined period being comprised of first and second half periods interconnected by a clocking transition which when applied to the remote data storage device 24 causes the clocking out of data therefrom to the local data storage device 22. The purpose or function of the automatic clock phase adjustment circuit 26 is to determine in which half of the period of the output clock pulses the transitions of the data received at the local unit 12 are occurring so that the data can be clocked in to the local storage device 22 in the opposite or other half of the period and thereby insure that data transitions will not coincide with the leading or clocking edge of the local or input clock pulses applied to the local storage device 22 for clocking in the data.

For carrying out this purpose, the clock divider network 28 also produces a sampling pulse during each of the first and second half periods of the output clock pulses. Each of the sampling pulses defines a sample area or interval of shorter duration that the corresponding half period of the output clock pulse during which the respective sampling pulse is produced. Also, the sampling pulse is located between and inwardly from the opposite ends of the corresponding half period. The data transition detector 30 receives the output clock pulses and the sampling pulses and monitors the data as it is clocked to the local storage devide 22. When coincidence of a transition in incoming data with a sampling pulse occurs, it is detected by the detector 30 and an indicator pulse is produced which is representative of the one of the first and second half periods of the output clock pulse during which the coincidence of the data transition with the interval of a sampling pulse occurred. Since each output clock pulse which clocks out data from the remote unit 14 has only one data clocking transition per period, there can only be one data transition per period of the output clock pulse and it must occur in one half of the period or the other.

The clock phase storage 32 receives the indicator pulse from the detector 30 and receives the output clock pulses from the network 28. At the end of the period of each of the output clock pulses, the storage 32 produces a control pulse which represents the other of the output clock pulse period halves in which input or local clock pulses will be produced for clocking in the data to the local storage device 22. The clock phase selector 34 receives the output clock pulses, the control pulses and timing pulses. The latter pulses are produced by the clock divider network 28 also. Each of the timing pulses has a transition which occurs approximately at the middle of the interval of each of the sampling pulses. The purpose for placement of the timing pulse transition at the center of each sampling pulse interval is so that the data will be clocked in or transferred through the local storage device 22 at the center of the sampling interval. This will allow data transitions to occur outside the sample interval but up to either of the opposite edges of the sample interval, while still maintaining a range or margin of safety which allows reliable data transfer.

Continuing on, when the clock phase selector 34 receives the output clock pulses, the control pulses and the timing pulses, input clock pulses are produced which are applied to the local storage device 22 for clocking in of data during the intervals of the sampling pulses occurring within the other of the first and second half periods of the output clock pulses as determined by the control pulses. Also, the clock phase selector 34 functions to disable the application of input clock pulses to the local storage device 22 during the intervals of the sampling pulses occurring within the one of the first and second output clock pulse half periods wherein the occurrence of data transitions were earlier detected. Thus, the circuit 26 insures that input clock pulses are applied to the local storage device 22 during intervals when there can be no possibility of their coincidence with transitions in the incoming data.

Figure 5:
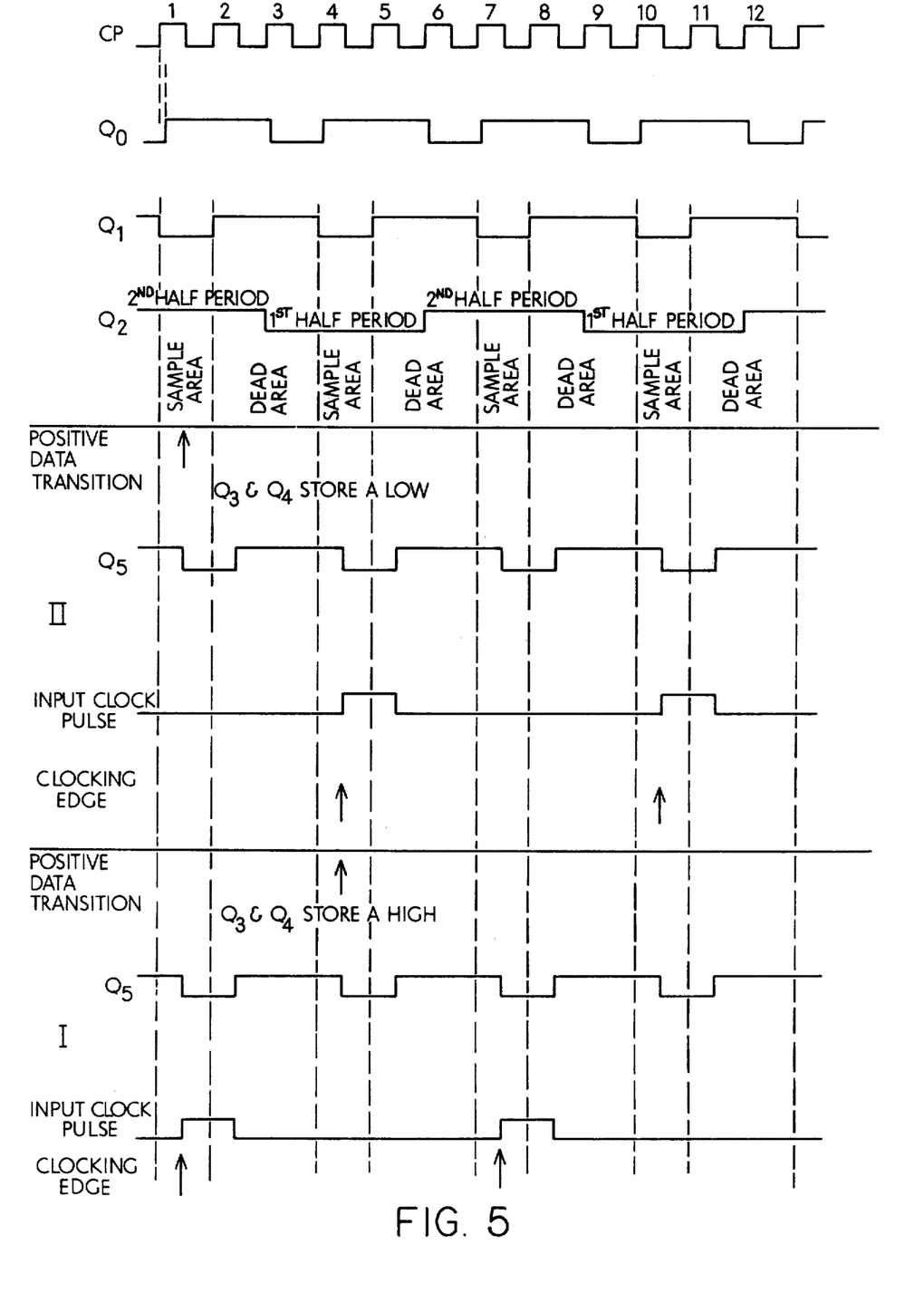
FIG. 5 is a timing diagram useful in explaining in detail the operation of the circuit depicted in FIG. 4.

Referring now to FIGS. 4 and 5, there is respectively illustrated the preferred embodiment of the circuit 26 in detail and a timing diagram of the various pulses produced by the circuit which graphically illustrates its operation.

The clock divider network 28 of the circuit 26 includes a NOR gate 36 and four flip-flops 38, 40, 42 and 44. The data transition detector 30 includes two NOR gates 46 and 48 and a flip-flop 50. The clock phase storage 32 includes a flip-flop 52, while the clock phase selector 34 includes two NOR gates 54 and 56. Each of the flip-flops has inputs CK and D and outputs Q and $\overline{Q}$. The arrangement of this type of flip-flop is such that the signal level or state on the D input is transferred to the Q output, and its inverse or opposite state to the $\overline{Q}$ output, on receipt of a positive-going edge, or low to high transition of the pulse applied to the CK input of the flip-flop. The preferred embodiment of the automatic clock phase adjustment circuit 26 of FIG. 4 can best be understood by describing the interaction between its above-mentioned parts during its operation and with reference to the timing diagram of FIG. 5.

In the detailed description of the circuit 26 which follows, attention will first be directed to how the output clock pulses and the sampling pulses are produced by the clock divider network 28 of the circuit 26 since interaction between two of the parts of the network 28, i.e., the two flip-flops 38 and 40, is involved in the production of both the output clock pulse and the sampling pulse. At the outset, it should be mentioned that the output clock pulses for clocking out data from the remote storage device 24 are produced at the $Q_2$ output of the flip-flop 42 through interaction of the NOR gate 36 and the flip-flops 38, 40 and 42; while the sampling pulses are produced at the $Q_1$ output of the flip-flop 40 through interaction of the NOR gate 36 and the flip-flops 38 and 40. The explanation of these interactions will proceed in relation to the consecutive arrival of clock pulses CP-1, CP-2 and CP-3 (FIG. 5) from the clock pulse generator 20 through the NOR gate 36 and at the CK inputs of flip-flops 38 and 40. It will be noted that the NOR gate 36 outputs the clock pulses CP to the CK inputs of the flip-flops 38 and 40 in the same phase as they were received by the NOR gate 36.

To begin, the first clock pulse CP-1 arrives at the CK inputs of the flip-flops 38 and 40. Since the D input of the flip-flop 38 is connected to ground potential, upon the positive-going transition or leading edge of CP-1 being applied to the CK input of the flip-flop 38 the $Q_0$ output of the flip-flop will try to go low. However, whenever a feedback override signal from the $\overline{Q}_1$ output of the flip-flop 40, that is a high level signal, is felt on the input S of the flip-flop 38, that will force the $Q_0$ output to a high state. Therefore, before it can be determined what the Q-hd 0 output state of the flip-flop 38 will be after CP-1 is applied to the CK input of the flip-flop 38, the result of the application of CP-1 to the CK input of the flip-flop 40 must first be determined.

Before arrival of the positive-going transition or edge of the first clock pulse CP-1 at the CK input of flip-flop 40, a low is being felt on the D input of the latter due to the fact that the $Q_0$ output of the flip-flop 38 is low. When the positive transition of CP-1 arrives, the low in the D input is transferred to the $Q_1$ output of the flip-flop 40. Thus, the latter's $Q_1$ output goes from high to low, while its $\overline{Q_1}$ output goes from low to high. The high of the $\overline{Q_1}$ output of flip-flop 40 will be felt on the S input of the flip-flop 38, which forces its $Q_0$ output to go high. Referring to the CP and $Q_0$ lines of the timing diagram of FIG. 5, it will be noted that there is a short delay (depicted by the parallel broken lines) between the positive transition of first clock pulse CP-1 and the positive transition of $Q_0$. This is shown to point out that the application of the positive transition of the CP-1 to the CK input of the flip-flop 38 did not directly, or at that instance, cause the positive transition on its $Q_0$ output, but instead the transition of the $\overline{Q_1}$ output of the flip-flop 40 which was fed back as an override high state to the S input of the flip-flop 38 produced the positive transition or high on the $Q_0$ output of the flip-flop 38.

It has now been determined that with the arrival of the positive transition of the CP-1 at the CK inputs of flip-flops 38 and 40, the $Q_0$ output of flip-flop 38 goes high, while its $\overline{Q_0}$ output goes low and the $Q_1$ output of flip-flop 40 goes low, while its $\overline{Q_1}$ output goes high. Since the $\overline{Q_0}$ output of the flip-flop 38 is applied to the CK input of the flip-flop 42 and in view that only a positive, or low to high, transition at the CK input of a flip-flop will cause the transfer to its Q output of the state being felt on its D input, the negative, or high to low, transition of the $\overline{Q_0}$ output of the flip-flop 38 does not effect a transfer from the D input to the $Q_2$ output of flip-flop 42. For purposes of discussion and conformity with the $Q_2$ line of the timing diagram of FIG. 5, it will be assumed that the $Q_2$ output is at a high state and its $\overline{Q_2}$ output and its D input, which is coupled to its $\overline{Q_2}$ output, are thus at a low state.

To summarize, after the arrival of the positive, or low to high, transition of the first clock pulse CP-1 from the NOR gate 36 to the CK inputs of flip-flops 38 and 40, positive transitions in signal level were noted at the $Q_0$ output of flip-flop 38 and $\overline{Q_1}$ of flip-flop 40, while negative transitions were noted at the $\overline{Q_0}$ output of flip-flop 38 and $Q_1$ output of flip-flop 40. However, no transition in signal level was noted at either of the outputs of flip-flop 42. Therefore, the latter's $Q_2$ output remained at a high state and its $\overline{Q_2}$ output and D input remained at a low state.

Following next, the positive transition of the second clock pulse CP-2 arrives at the CK inputs of flip-flops 38 and 40. At the flip-flop 40, the high being felt at its D input (from the $Q_0$ output of flip-flop 38) is transferred to its $Q_1$ output, thereby producing a positive, or low to high, transition at the $Q_1$ output. Correspondingly, a negative, or high to low, transition is produced at the $\overline{Q_1}$ output which causes the S input of flip-flop 38 to go from high to low. In other words, the override high state is removed from the S input. However, removal of the override state at the S input of the flip-flop 38 did not occur until after the positive transition of the CP-2 had arrived at the CK input of the flip-flop 38. Therefore, the flip-flop 38 could not respond to CP-2 because the $\overline{Q_1}$ output of flip-flop 40 was still holding the $Q_0$ output of flip-flop 38 at a high state. Instead, the removal of the override state of the S input of the flip-flop 38 will allow the latter to respond to the next or third clock pulse. Since the arrival of the positive transition of the second clock pulse CP-2 produced no change on the $Q_0$ and $\overline{Q_0}$ output states of the flip-flop 38, the states of the $Q_2$ and $\overline{Q_2}$ outputs of the flip-flop 42 remain unchanged also.

Following thereafter, the positive transition of the third clock pulse CP-3 arrives at the CK inputs of flip-flops 38 and 40. The low state of the D input of flip-flop 38 (the D input being coupled to ground) is transferred to the $Q_0$ output and the latter goes low since the S input is at a low state. However, before the CP-3 arrived, $Q_0$ was at a high state, and so the D input of flip-flop 40 was high. Thus, when the positive transition of the CP-3 arrives at the CK input of flip-flop 40, the high on its D input is transferred to its $Q_1$ output. However, since the $Q_1$ output was already in a high state as a result of previous clock pulse CP-2, there is no change in the level of the $Q_1$ output, and correspondingly no change in the level of the $\overline{Q_1}$ output. Additionally, the S input of the flip-flop 38 stays low. However, the change in the output states of the flip-flop 38 produces a change in the output states of the flip-flop 42. The positive, or low to high, transition of the $Q_0$ output of flip-flop 38 is applied to the CK input of flip-flop 42 which causes the low being felt at its D input to transfer to its $Q_2$ output. Correspondingly, the $\overline{Q_2}$ output changes from low to high which places a high on the D input. The connection of the $\overline{Q_2}$ output of flip-flop 42 to its D input makes the flip-flop 42 switch or toggle back and forth each time the state of the $Q_0$ output of flip-flop 38 changes. Specifically, each time the $Q_0$ output state of flip-flop 38 makes a negative, or high to low, transition, and correspondingly its $\overline{Q_0}$ output state makes a positive transition, the $Q_2$ output of flip-flop 42 makes a transition, alternating between high and low states.

To briefly summarize, after the arrival of the positive transition of the third clock pulse CP-3 from the NOR gate 36 to the CK inputs of flip-flops 38 and 40, a negative transition in the $Q_0$ output state of flip-flop 38 was noted, while a positive transition occurred in its $\overline{Q_0}$ output state. No change in the output states of the flip-flop 40 occurred, $Q_1$ remaining high and $\overline{Q_1}$ low. At flip-flop 42, its $Q_2$ output made a negative, or high to low transition, while its $\overline{Q_2}$ output went from low to high.

Referring back for a moment to the output states of the flip-flops 38 and 40 before the arrival of the positive transition of the first clock pulse CP-1, it will be recalled that the $Q_0$ output was low, $\overline{Q_0}$ output was high, $Q_1$ output was high and $\overline{Q_1}$ output was low. The arrival of the positive transition of CP-1 at the CK input of flip-flop 40 caused its $\overline{Q_1}$ output to go from high to low and its $Q_1$ output to go from low to high. The positive transition in the state at the $\overline{Q_1}$ output placed a high on the S input of the flip-flop 38 which caused its $Q_0$ input to go high after CP-1 was received at the CK input of flip-flop. Finally, the $Q_0$ output went low. The output states of the flip-flops 38 and 40 after the application of the positive transition of the third clock pulse CP-3 to their CK inputs are identical to their output states before the arrival of the first clock pulse CP-1. Therefore, upon arrival of the positive transition of a fourth clock pulse CP-4, the same transitions occur at the outputs of the flip-flops 38 and 40 as occurred previously upon receipt of the positive transition of the first clock pulse CP-1. Thus, the successive arrivals of the fourth, fifth and sixth clock pulses, CP-4, CP-5 and CP-6, at the CK inputs of flip-flops 38 and 40 cause the repeat of the sequence of output transitions which were described above with respect to the successive arrivals of the first, second and third clock pulses, CP-1, CP-2 and CP-3. However, the $Q_2$ output state, which changed from high to low when $Q_0$ output changed from high to low upon the arrival of CP-3, changes from low to high when the $Q_0$ output changes from high to low upon the arrival of CP-6.

It is seen, therefore, that the period of an output clock pulse produced at the $Q_2$ output of the flip-flop 42 of the network 28 is six times greater than that of a single clock pulse produced by the generator 20. In other words, the network 28 has effectively performed a divide by six operation on the frequency of the clock pulses from the generator 20 to produce the output clock pulse. Furthermore, it is seen that the period of the output clock pulse is comprised by two half periods interconnected by a transition. In the operation of the circuit 26, only the positive, or low to high, transition of the output clock pulse is used as a data clocking transition. The negative transition which occurs at what is considered the end of the output clock pulse period, or start of the next period depending upon one's frame of reference, is not used to clock out data. The decision to use the positive instead of the negative transition was arbitrarily arrived at. However, the decision to use only one or the other (in this case the positive one) and not both was made to minimize costs and complexity of the circuit, it being found that there is no appreciable diminution in operating efficiency as a result.

At the start of this discussion of the circuit 26, it was mentioned also that the sampling pulses are produced by the $Q_1$ output of the flip-flop 40 of the network 28. By comparing the $Q_1$ and $Q_2$ lines of the timing diagram of FIG. 5, it will be realized that the intervals of the sampling pulses are defined when the $Q_1$ output of flip-flop 40 is in a low state. Furthermore, it will be recognized that each of these sampling intervals occurs during each one of the half periods of the output clock pulse depicted on the $Q_2$ line in FIG. 5. Also, the interval of each sampling pulse is of shorter duration than the corresponding half period of the output clock pulse and is centered in relation to the half period. While the centered relationship is preferred, it at least is desired that the sampling pulse be located between and displaced inwardly from the opposite ends of the corresponding half period of the output clock pulse.

It was mentioned earlier that the purpose of the circuit 26 is to determine in which half of the period of the output clock pulses the transitions in the data received at the local unit 12 are occurring so that the data can be clocked into the local storage device 22 in the opposite or other half of the period and thereby insure that data transitions will not coincide with the clocking edge of the local or input clock pulses applied to the local storage device 22 for clocking in the data. These sampling pulses are utilized by the data transition detector 30 of the circuit 26 to fulfill the next step in carrying out the purpose of the circuit. It will be noted that, in FIG. 5, the intervals between the sampling pulses have been termed "dead areas." A "dead area" is defined when the $Q_1$ output of flip-flop 40 is at a high state. The data transition detector 30 will not respond to any transition of data within a dead area. Data can be clocked in at the local storage device 22 even though the data is making a transition within the dead area of the same half period of the output clock pulse as that within which the input clock pulse is applied to the device 22. As will become apparent later, the interval of the sampling pulse extends in both directions from the data clocking edge of the input clock pulse and thereby builds an acceptable margin of safety into the circuit 26. Once a data transition is detected within the interval or area of a sampling pulse of one period half, the circuit 26 immediately produces the input clock pulse during the interval of the sampling pulse occurring in the other period half.

As briefly mentioned above, the data transition detector 30 includes two NOR gates 46 and 48 and a flip-flop 50. Also, the clock phase storage 32 includes a flip-flop 52. The $Q_3$ output of flip-flop 50 of detector 30 is connected to the D input of flip-flop 52 of the clock phase storage 32 so that whatever level or state is present on the $Q_3$ output of flip-flop 50 is felt on the D input of flip-flop 52. The $\overline{Q_3}$ output is coupled back to one input of the NOR gate 48 of the detector 30, the other input of the NOR gate 48 being connected to the $\overline{Q_1}$ output of the flip-flop 40 of the clock divider network 28. One input of the other NOR gate 46 of the detector 30 is connected to the $Q_2$ output of the flip-flop 42 of the network 28, while the other input of the NOR gate 46 is connected to the $Q_1$ output of the flip-flop 40. The single output of each of the NOR gates 46 and 48 is connected together and then to the D input of the detector's flip-flop 50.

The flip-flop 50 of the detector 30 will monitor the incoming data and whenever a position transition of data occurs, it will be applied to the CK input and cause the transfer of whatever state was present on the D input to the $Q_3$ output and the inverse to the $\overline{Q_3}$ output of the flip-flop 50. Also, the state transferred to the $Q_3$ output will be felt on the D input of the clock phase storage flip-flop 52. However, the intended function of the detector 30 is to store at its flip-flop's $Q_3$ output a signal level which indicates the particular one of the half periods in which a positive data transition most recently occurred during the sample interval of that particular one half period. Since the $Q_2$ output state of the flip-flop 42 defines the particular half period in which the circuit 26 is operating at any given moment, the $Q_2$ output state must in some manner be utilized to influence the state of the $Q_3$ output of the detector flip-flop 50 so as to indicate the particular one of the half periods present when the positive data transition was detected by the detector 30. Also, since the function of the detector 30 is only to detect a positive data transition during the interval of a sampling pulse, the $Q_1$ output state (or its complement at the $\overline{Q_1}$ output) of the flip-flop 40 must in some manner be utilized to control the operation of the detector flip-flop 50 so that any positive data transition which occurs during the interval of a dead area (not within a sample area) will not be able to cause a change in the state of the $Q_3$ output of the flip-flop 50. The particular arrangement of the NOR gates 46 and 48 in the detector 30 insures that the detector operates in accordance with its intended function.

If the $Q_1$ output of the flip-flop 40 is at a high state, signifying that at that moment the circuit 26 is operating in a dead space, when a positive data transition arrives at the CK input of the detector flip-flop 50, the $Q_3$ output state will not change irrespective of which state it was in if the detector 30 is operating in accordance with its intended function. The particular arrangement of the NOR gates 46 and 48 insures that no change will be effected at the $Q_3$ output.

To demonstrate that no change at the $Q_3$ output can happen at a moment when the circuit 26 is operating in a dead area and a positive data transition is received at the CK input of flip-flop 50, first assume that the $Q_3$ output is at a high state. When the $Q_3$ output is high, the $\overline{Q_3}$ output of the flip-flop 50 is low. The low of the latter is felt at one input to the NOR gate 48. The other input to the NOR gate 48 has applied to it the state of the $\overline{Q_1}$ output of the flip-flop 40 which is low when the circuit is operating in a dead area. With both of its inputs low, the output of the NOR gate 48 is high. Since the high state of the $Q_1$ output of flip-flop 40 is felt at one of the inputs of the other NOR gate 46, the output of the latter is disabled and tends to go low. But, since the two outputs of the NOR gates 46 and 48 are connected together, the high output of NOR gate 48 controls and is felt on the D input of the flip-flop 50. So when the positive data transition is applied to the CK input of the flip-flop 50, the same high signal level is present at both its D input and $Q_3$ output and consequently no transition or change occurs at the $Q_3$ output.

Next, assume that the $Q_3$ output of the flip-flop 50 is at a low state when a positive data transition is received at its CK input as the circuit 26 is operating in a dead area. When the $Q_3$ output is low, the $\overline{Q_3}$ output of flip-flop 50 is high. The high of the latter is felt at the one input to the NOR gate 48 and thus the output of the latter is disabled and tends to go low. With respect to the other NOR gate 46, the high state of the $Q_1$ output of the flip-flop 40 is felt at one of the inputs of the NOR gate 46 and renders its output low. Thus, both outputs of the NOR gates 46 and 48 are low and consequently a low is felt on the D input of the flip-flop 50. So when the positive data transition is applied to the CK input of the flip-flop 50, the same low signal level is present at both its D input and $Q_3$ output; therefore, no transition or change occurs at the $Q_3$ output.

It has just been shown that no change occurs at the $Q_3$ output at a moment when the circuit 26 is operating in a dead area and a positive data transition is received at the CK input of the detector flip-flop 50. Since the intended function of the detector 30 is to store at its flip-flop's $Q_3$ output a pulse or signal level which indicates in which particular half period a positive data transition most recently occurred during the sample interval of that particular half period, now the operation of the detector 30 will be described when the data transition is detected in a sample area in, first, the first half period, and, then, the second half period in order to determine what the respective level of the $Q_3$ output will be for each of these half periods. Once these $Q_3$ output levels have been determined, the operational steps performed by the remaining parts of the circuit 26 will be explained.

First, assume the circuit 26 is operating in a sample interval within the first half period of the output clock pulse at the moment when a positive data transition is received at the CK input of the detector flip-flop 50. The vertical arrow appearing opposite the caption "Positive Data Transition" in FIG. 5-I illustrates the time of arrival of the data transition in relation to a sample interval or area defined on the $Q_1$ line and the first half period defined on the $Q_2$ line of the diagram. The $Q_2$ output of flip-flop 42 is low during the first half period of the output clock pulse. This low is felt on one input to the NOR gate 46. The other input to the NOR gate 46 has the same state as the $\overline{Q_1}$ output of the flip-flop 40 which is low during a sample interval. With both inputs of the NOR gate 46 low, its output is high. With respect to the NOR gate 48, one of its inputs has the same state as the $\overline{Q_1}$ output of the flip-flop 40 which is high since it is the inverse of the $Q_1$ output. This high at the one input of the NOR gate 48 disables its output so that the output tends to go low. But, since the two outputs of the NOR gates 46 and 48 are connected together, the high output of the NOR gate 46 controls and is felt on the D input of the flip-flop 50. So when the positive data transition is received at the CK input of the flip-flop 50, the high at the D input is transferred to the $Q_3$ output of the flip-flop. Therefore, a high state stored at the $Q_3$ output of the detector flip-flop 50 indicates that the most recently received positive data transition occurring during a sample interval happened during the first half period of the output clock pulse.

Next, assume the circuit 26 is operating in a sample interval within the second half period of the output clock pulse at the moment when a positive data transition is received at the CK input of the detector flip-flop 50. The vertical arrow appearing opposite the caption "Positive Data Transition" in FIG. 5-II illustrates the time of arrival of the data transition in relation to a sample interval or area defined on the $Q_1$ line and the second half period defined on the $Q_2$ line of the diagram. The $Q_2$ output of flip-flop 42 is high during the second half period of the output clock pulse. This high is felt on one input to the NOR gate 46. The other input to the NOR gate 46 has the same state as the $Q_1$ of the flip-flop 40 which is low during a sample interval. However, because of the high input of the NOR gate 46 from the $Q_2$ output, the output of the NOR gate 46 is low. With respect to the NOR gate 48, one of its inputs has the same state as the $\overline{Q_1}$ output of the flip-flop 40 which is high. This high at the one input of the NOR gate 48 disables its output so that the output tends to go low. Thus, both outputs of the NOR gates 46 and 48 are low and consequently a low is felt in the D input of the flip-flop 50. So when the positive data transition is received at the CK input of the flip-flop 50, the low at the D input is transferred to the $Q_3$ output of the flip-flop. Therefore, a low state stored at the $Q_3$ output of the detector flip-flop 50 indicates that the most recently received positive data transition occurring during a sample interval happened during the second half period of the output clock pulse.

Turning now to the operational steps performed by the remaining parts of the circuit 26, these steps will first be explained with the assumption the indicator pulse level stored on the $Q_3$ output of the detector flip-flop 50 is high, meaning that the most recently received positive data transition occurring during a sample interval or area happened during the first half period of the output clock pulse. Thereafter, these remaining operational steps will be briefly explained with the assumption that the indicator pulse level stored on the $Q_3$ output of the detector flip-flop 50 is low, meaning that the most recently received positive data transition occurring during a sample interval or area happened during the second half period of the output clock pulse. By the just-completed description of the data transition detector 30, one can recognize that part of the intended purpose of the circuit has been accomplished, that being, to determine the one particular half of the period of the output clock pulses during a sampling interval wherein a positive transition in the incoming data occurred. The goal of the operational steps of the remaining parts of the circuit 26 to be now described is to accomplish the rest of the intended purpose of the circuit 26, that being, to cause the production of local or input clock pulses in the opposite or other half of the period of the output clock pulses to insure that positive data transitions will not coincide with the clocking edge of the input clock pulses when applied to the local storage device 22 for clocking in the data.

First, with a high indicator pulse level stored on the $Q_3$ output of the detector flip-flop 50, a high is felt on the D input of the clock phase storage flip-flop 52. Since the CK input of storage flip-flop 52 is connected to the $Q_2$ output of the network flip-flop 42, the high indicator pulse level being felt on the D input of the flip-flop 52 is transferred to and stored at its $Q_4$ output when the output clock pulse received at its CK input makes the next low to high transition which, as defined heretofore, occurs between the first period half and the second period half. So the positive data transition that was detected and stored in the $Q_3$ output of the detector flip-flop 50 as a high will be held there during the dead area interval which followed the sample area and until the arrival of the next positive transition in the output clock pulse at the CK input to the storage flip-flop 52. Now the high state stored on the $Q_4$ output of the flip-flop 52, as well as the $Q_3$ output of the flip-flop 50, will remain there until a subsequent positive data transition is detected which occurs within a sample area during the other or second half period of the output clock pulse. The high stored on the $Q_4$ output of the storage flip-flop 52 represents or means that the second period half will be selected for producing local or input clock pulses for clocking in the incoming data to the local data storage device 22. Thus, the high $Q_4$ output state may be viewed as a pulse or signal level for controlling the operation of the clock phase selector 34 which is connected to the $\overline{Q_4}$ outputs of the storage 32.

As briefly mentioned previously, the clock phase selector 34 includes two NOR gates 54 and 56. Their outputs are connected together and then to the CK input of the local data storage device 22. One of the inputs of the NOR gate 54 is connected to the $\overline{Q_4}$ output of the storage flip-flop 52. A second input of the NOR gate 54 is connected to the $Q_5$ output of the flip-flop 44 of the network 28, while a third input is connected to the $\overline{Q_2}$ output of the flip-flop 42. One of the inputs of the NOR gate 56 is connected to the $Q_4$ output of the storage flip-flop 52. A second input of the NOR gate 56 also is connected to the $Q_5$ output of the flip-flop 44 of the network 28, while a third input is connected to the $Q_2$ output of the flip-flop 42.

Before explaining the operation of the NOR gates 54 and 56, it should be mentioned that the flip-flop 44 of the clock divider network 28 is the part thereof which produces the timing pulses such that each has a transition (in this case a negative one) which occurs approximately at the middle of the interval or area of each of the sampling pulses. As mentioned previously, the purpose for placement of the timing pulse negative transition at the center of each sampling pulse interval is so that the positive transition of the input clock pulse produced by the selector 34 for clocking in data will occur at the center of the sample interval, thereby maximizing the margin of safety for achieving reliable data transfer through the local storage device 22. The timing pulses from the $Q_5$ output of the flip-flop 44 are the same as the sample pulses produced by the $Q_1$ output of the flip-flop 40 except the timing pulses are delayed relative to the sample pulses by one half of the period of a clock pulse CP. This results from the transfer of the $Q_1$ output being felt at the D input of flip-flop 44 to its $Q_5$ output upon application of the complement or inverse of the clock pulses CP from the complement output of the NOR gate 36 to the CK input of the flip-flop 44.

Continuing on with the description of the operation of the NOR gates 54 and 56 of the selector 34, it will be seen that the high control pulse state at the $Q_4$ output of the storage flip-flop 52 and its complement or low state at the $\overline{Q_4}$ output of the flip-flop 52 will only allow the production of input clock pulses at the connected output of the NOR gates 54 and 56 when the negative transition of timing pulses from the $Q_5$ output are felt at one input of each of the NOR gates during the second half periods of the output clock pulses. In other words, when timing pulse negative transitions are felt at one input of each of the NOR gates 54 and 56 during the first half periods of the output clock pulses, the high control pulse state at the $Q_4$ output and its complement or low state at the $\overline{Q_4}$ output of the flip-flop 52 will prevent or disable production of input clock pulses at the combined NOR gate output.

To demonstrate the latter situation, during the first half period of the output clock pulse the $Q_2$ output is low and its complement $\overline{Q_2}$ output is high. The low is felt at one input of the NOR gate 56 and the high is felt at one input of the NOR gate 54. The high at the $Q_4$ output is felt at a second input of the NOR gate 56 and the low at the $\overline{Q_4}$ output is felt at a second input of the NOR gate 54. Thus, when the negative, or high to low, transition of the $Q_5$ output is applied to each of the third inputs of the NOR gates, each of the NOR gates has at least one input with a high applied to it, so their combined output which is applied to the CK input of the flip-flop or local storage device 22 is low which does not cause a clocking in or transfer of incoming data from its D input to its Q output.

However, demonstrating the former situation wherein an input clock pulse will be produced, during the second half period of the output clock pulse the $Q_2$ output is high and its complement $\overline{Q_2}$ output is low. The high is felt at one input of the NOR gate 56 and the low is felt at one input of the NOR gate 54. Furthermore, the high at the $Q_4$ output is felt at the second input of the NOR gate 56 and the low at the $\overline{Q_4}$ output is felt at the second input of the NOR gate 54. Thus, when the negative transition of the $Q_5$ output is applied to each of the third inputs of the NOR gates, only the NOR gate 56 has at least one high input (in fact, it has two high inputs); therefore, its output is disabled. All of the inputs to the NOR gate 54 are now low; therefore, its output goes high so the combined output of the NOR gates is high and upon application to the CK input of the flip-flop 22 incoming data being felt on its D input is clocked in or transferred to its Q output (and thus to the local multiplexer unit).

To summarize, it has just been described how the remaining parts of the circuit accomplish the rest of the intended purpose of the circuit 26, that being to cause the production of a local or input clock pulse during the second half period of the output clock pulse when the indicator pulse level stored at the $Q_3$ output of the detector flip-flop 50 is high, which meant that the most recently received positive transition of data occurring during a sample area happened during the first half period of the output clock pulse. Since production of the input clock pulse takes place during a sample area in the second period half, there is no possibility that its clocking edge will coincide with a positive transition of data when applied to the local storage device 22. Finally, the operational steps of these remaining parts of the circuit 26 will be explained with the assumption being made that the indicator pulse level stored at the $Q_3$ output of the detector flip-flop 50 is low, meaning it will be recalled that the most recently received positive data transition occurring during a sample area happened during the second half period of the output clock pulse. Thus with a low indicator pulse level stored at the $Q_3$ output of the detector flip-flop 50, a low is felt on the D input of the clock phase storage flip-flop 52. Since the CK input of storage flip-flop 52 is connected to the $Q_2$ output of the network flip-flop 42, the low indicator pulse level being felt on the D input of the flip-flop 52 is transferred to and stored at its $Q_4$ output when the output clock pulse received at its CK input makes the next low to high transition. So the positive data transition that was detected and stored in the $Q_3$ output of the detector flip-flop 50 as a low will be held there during the subsequent dead and sample areas until the arrival of the next positive transition in the output clock pulse at the CK input to the storage flip-flop 52. Now the low state stored on the $Q_4$ output of the flip-flop 52, as well as the $Q_3$ output of the flip-flop 50, will remain there until a subsequent positive data transition is detected which occurs within a sample area during the other or first half period of the output clock pulse. The low stored on the $Q_4$ output of the storage flip-flop 52 represents or means that the first period half will be selected for producing local or input clock pulses for clocking in the incoming data to the local data storage device 22.

Continuing on to the description of the operation of the selector NOR gates, it will be seen that the low control pulse state at the $Q_4$ output of the storage flip-flop 52 and its complement or high state at the $\overline{Q_4}$ output of the flip-flop 52 will only allow the production of input clock pulses at the connected output of the NOR gates 54 and 56 when the negative transition of the timing pulses from the $Q_5$ output of network flip-flop 44 are felt at one input of each of the NOR gates during the first half periods of the output clock pulses. In other words, when timing pulse negative transitions are felt at one input of each of the NOR gates 54 and 56 during the second half periods of the output clock pulses, the low control pulse state at the $Q_4$ output and its complement or high state at the $\overline{Q_4}$ output of the flip-flop 52 will prevent or disable production of input clock pulses at the combined NOR gate outputs.

To demonstrate the latter situation, during the second half period of the output clock pulse the $Q_2$ output is high and its complement $\overline{Q_2}$ output is low. The high is felt at one input of the NOR gate 56 and the low is felt at one input of the NOR gate 54. The low at the $Q_4$ output is felt at a second input of the NOR gate 56 and the high at the $\overline{Q_4}$ output is felt at a second input of the NOR gate 54. Thus, when the negative transition of the $Q_5$ output is applied to each of the third inputs of the NOR gates, each of the NOR gates has at least one input with a high applied to it, so their combined output which is applied to the CK input of the flip-flop or local storage device 22 is low which does not cause a clocking or transfer of incoming data from its D input to its Q output.

However, demonstrating the former situation wherein an input clock pulse will be produced, during the first half period of the output clock pulse the $Q_2$ output is low and its complement $\overline{Q_2}$ output is high. The low is felt at one input of the NOR gate 56 and the high is felt at one input of the NOR gate 54. Furthermore, the low at the $Q_4$ output is felt at the second input of the NOR gate 56 and the high at the $\overline{Q_4}$ output is felt at the second input of the NOR gate 54. Thus, when the negative transition of the $Q_5$ output is applied to each of the third inputs of the NOR gates, only the NOR gate 54 has at least one high input (in fact, it has two high inputs); therefore, its output is disabled. All of the inputs to the NOR gate 56 are now low; therefore, its output goes high. So the combined output of the NOR gates is high and upon application to the CK input of the flip-flop 22 incoming data being felt on its D input is clocked in or transferred to its Q output (and thus to the local multiplexer unit).

It has just been described how the remaining parts of the circuit 26 accomplish the rest of the intended purpose of the circuit, that being to cause the production of a local or input clock pulse during the first half of the output clock pulse when the indicator pulse level stored at the $Q_3$ output of the detector flip-flop 50 is low, which meant that the most recently received positive transition of data occurring during a sample area happened during the second half period of the output clock pulse. Since the production of the input clock pulse takes place during a sample area in the second period half, there is no possibility that its clocking edge will coincide with a positive transition of data when applied to the local storage device 22.

FIGS. 5-I and -II illustrate the above-described operational steps of the remaining parts of the circuit 26. In FIG. 5-I the indicator pulse level stored on the $Q_3$ output and the control pulse level stored on the $Q_4$ output are both low, meaning that the most recently detected positive data transition occurring during a sample area happened during the first half period. Therefore, clocking edges of input clock pulses are produced on negative transitions of the $Q_5$ timing pulses occurring during sample areas in the second half periods. In FIG. 5-II the indicator pulse level stored on the $Q_3$ output and the control pulse level stored on the $Q_4$ output are both high, meaning that the most recently detected positive data transition occurring during a sample area happened during the second half period. Therefore, clocking edges of input clock pulses are produced on negative transitions of the $Q_5$ timing pulses occurring during sample areas in the first half periods.

Having thus described the invention, what is claimed is:

1. A method of clock phase adjustment in a data clocking system, comprising the steps of:
producing at a local unit output clock pulses each having first and second period portions interconnected by a transition;
transmitting said output clock pulses to a remote unit;
clocking data out from said remote unit with said transitions;
sampling each of said period portions at said local unit with a sampling pulse of shorter duration than said respective period portion;
transmitting said data clocked out from said remote unit to said local unit;

monitoring said clocked out data at said local unit for determining in which one of said sampled period portions a transition in said data occurs; and producing phase adjusted input clock pulses at said local unit during the sample pulse in the other of said period portions for clocking said data into said local unit.

2. A method of clock phase adjustment in a data clocking system, comprising the steps of:

producing at a local unit output clock pulses each having first and second period portions interconnected by a transition;

transmitting said output clock pulses to a remote unit;

clocking data out of said remote unit with said transitions;

sampling each of said period portions at said local unit with a sampling pulse of shorter duration than said respective period portion;

transmitting said data clocked out from said remote unit to said local unit;

monitoring said clocked out data at said local unit for a transition occurring during a sampling of either of said period portions;

storing at said local unit an indication of which of said sampled period portions said transition in said clocked out data most recently occurred; and producing phase adjusted input clock pulses at said local unit during the sample pulse in the other of said period portions for clocking said data into said local unit.

3. In a data clocking system having at a local unit a local data storage device and at a remote unit a remote data storage device connected to said local storage device a method of automatic clock phase adjustment, comprising the steps of:

producing at said local unit output clock pulses each having a predetermined period comprised of first and second half periods interconnected by a clocking transition;

transmitting said output clock pulses to said remote unit;

applying said clocking transitions to said remote data storage device to clock data out therefrom to said local data storage device;

transmitting said data clocked out from said remote unit to said local unit;

producing a sampling pulse at said local unit during each of said first and second half periods of said output clock pulses, each of said sampling pulses having an interval of shorter duration than the corresponding half period of said output clock pulse during which said respective sampling pulse is produced;

producing at said local unit a timing pulse for each said sampling pulse and having a transition occurring approximately at the middle of the interval of said sampling pulse;

monitoring said data at said local unit with said output clock pulses and said sampling pulses as said data is clocked to said local storage device to detect the one of said first or second half periods of said output clock pulses in which the coincidence of a transition of said data with one of said sampling pulses occurs; and producing phase adjusted input clock pulses at said local unit in response to said transitions of said timing pulses which occur during the other of said first or second half periods of said output clock pulses for stably clocking said data into said local data storage device.

4. In a data clocking system as recited in claim 3, wherein said last recited step further comprises the steps of:

producing indicator pulses which represent the one of said first and second half periods of said output clock pulses during which the coincidence of a data transition with a sampling pulse was most recently detected;

receiving said indicator pulses and said output clock pulses for producing control pulses representative of the one of said first and second half periods in which the coincidence of a data transition with a sampling pulse was most recently detected;

receiving said output clock pulses, said control pulses and said timing pulses for producing said phase adjusted input clock pulses;

applying said phase adjusted input clock pulses to said local storage device for clocking in data during the middle of the intervals of sampling pulses occurring within the other of said first and second half periods of said output clock pulses; and disabling the production of input clock pulses during the one of said first and second half periods wherein the coincidence of a data transition with the interval of a sampling pulse was most recently detected.

5. The method as recited in claim 3, wherein said respective sampling pulses produced during the first and second half periods of said output clock pulses are located between and displaced inwardly from the opposite ends of said corresponding half periods.

6. In a data clocking system having a local unit including a local data storage device and a remote unit having a remote data storage device, a clock phase adjustment circuit comprising:

means at said local unit for producing output clock pulses each having first and second period portions interconnected by a transition;

means for transmitting said output clock pulses to said remote unit;

means responsive to said transitions for clocking out data from said remote data storing device;

means at said local unit defining a sample area in each of said period portions of shorter duration than said respective period portion;

means for trasmitting said data clocked out from said remote data storage device to said local unit;

means at said local unit for monitoring said data transmitted from said remote unit for determining in which one of said period portions a transition in said data occurs during a sample area; and means at said local unit responsive to said monitoring means and operatively connected thereto for producing phase adjusted input clock pulses during the sample area in the other of said period portions for clocking said data transmitted from said remote unit into said local data storage device.

7. In a data clocking system having a local unit and a remote unit, a clock phase adjustment circuit, comprising:

means at said local unit for producing output clock pulses each having first and second period portions interconnected by a transition;

means for transmitting said output clock pulses to said remote unit;

means responsive to said transitions for clocking out data from said remote unit;

means at said local unit for defining a sample area in each of said period portions of shorter duration than said respective period portion;

means for transmitting said data clocked out from said remote unit to said local unit;

means at said local unit for monitoring said data transmitted from said remote unit for detecting a transition of said data occurring in a sample area of either one of said period portions;

means responsive to said monitoring means and operatively connected thereto for storing an indication of in which one of said period portions said transition in said data most recently occurred; and means responsive to said storing means and operatively connected thereto for producing phase adusted input clock pulses during the sample area in the other of said period portions for clocking said data transmitted from said remote unit into said local unit.

8. In a data clocking system having a local data storage device located in a local unit and a remote data storage device connected to said local data storage device, an automatic clock phase adjustment circuit, comprising:

means at said local unit for producing output clock pulses each having a predetermined period comprised of first and second half periods interconnected by a clocking transition;

means for applying said output clock pulses to said remote data storage device;

means responsive to said output clock pulses at said remote data storage device for clocking out data therefrom to said local data storage device;

means for transmitting said data clocked out from said remote data storage device to said local data storage device;

means at said local unit for producing a sampling pulse during each of said first and second half periods of said output clock puises, each of said sampling pulses having an interval of shorter duration than the corresponding half period of said output clock pulse during which said respective sampling pulse is produced;

means at said local unit for producing timing pulses having transitions occurring approximately at the middle of the interval of each of said sampling pulses;

means at said local unit operatively connected to said means for producing output clock pulses, to said means for producing sampling pulses and to said means for transmitting, for monitoring said output clock pulses, said sampling pulses and said data transmitted from said remote data storage device as the latter is clocked to said local storage device to detect the one of said first and second half periods of said output clock pulses in which the coincidence of a transition of said data with one of said sampling pulses occurs;

means at said local unit operatively connected to said means for producing timing pulses, to said means for producing output clock pulses, to said monitoring means and to said means for producing timing pulses for producing phase adjusted input clock pulses in response to said transitions of said timing pulses occurring during the other of said first and second half periods of said output clock pulses; and means responsive to said phase adjusted input clock pulses for clocking said data into said local data storage device.

9. The automatic clock phase adjustment circuit as recited in claim 8, wherein said means for producing phase adjusted input clock pulses further comprises:

means for producing indicator pulses which represent the one of said first and second half periods of said output clock pulses during which the coincidence of a data transition with a sampling pulse was most recently detected;

means responsive to and operatively connected with said means for producing said indicator pulses and with said means for producing said output clock pulses for producing control pulses repesenting the one of said first and second half periods in which the coincidence of a data transition with a sampling pulse was most recently detected;

means operatively connected with said means for producing control pulses for storing said control pulses;

means operatively connected with and responsive to said means for producing output clock pulses, to said means for storing said control pulses and to said means for producing timing pulses for producing said phase adjusted input clock pulses;

means for applying said phase adjusted input clock pulses to said local storage device for clocking data in during those sampling pulses occurring within the other of said first and second half periods of said output clock pulses; and means operatively connected to and responsive to said means for producing control pulses for disabling the production of input clock pulses during the one of said first and second half periods wherein the coincidence of a data transition with a sampling pulse was most recently detected.

10. The circuit as recited in claim 8, wherein said respective sampling pulses produced during the first and second half periods of said output clock pulses are located between and displaced inwardly from the opposite ends of said corresponding half periods.

11. In a data ciocking system having a local unit and a remote unit wherein said local unit includes a clock pulse generator and a local data storage device and said remote unit includes a remote data storage device connected to said local data storage device of said local unit, an automatic clock phase adjustment circuit comprising:

clock divider network means at said local unit connected to said clock pulse generator for receiving clock pulses from said clock pulse generator and producing output clock pulses each having a predetermined period comprised of first and second half periods interconnected by a clocking transition;

means for applying said output clock pulses to said remote storage device;

means responsive to said output clock pulses at said remote data storage device for clocking data out therefrom to said local data storage device;

means in said clock divider network means for producing a sampling pulse during each of said first and second half periods of said output clock pulses, each of said sampling pulses having an interval of shorter duration than the corresponding half period of said output clock pulse during which said respective sampling pulse is produced and being located between and displaced inwardly from the opposite ends of said corresponding half period;

further means in said clock divider network means for producing timing pulses each having a transition occurring approximately at the middle of the interval of each of said sampling pulses;

data transition detector means operatively connected with said clock divider network and said remote data storage device and responsive to said output clock pulses and said sampling pulses for monitoring said data as the latter is clocked to said local data storage device and detecting the coincidence of a transition of said data with one of said sampling pulses;

means responsive to said data transition detector means and operatively connected therewith for producing indicator pulses which represent the one of said first and second half periods of said output clock pulses during which the coincidence of a data transition with the interval of a sampling pulse was most recently detected;

clock phase storage means operatively connected with said means for producing indicator pulses and with said clock divider network and responsive to said indicator pulses and said output clock pulses for producing and storing control pulses which represent the one of said first and second half periods in which the coincidence of a data transition with the interval of a sampling pulse was most recently detected;

clock phase selector means operatively connected with said clock divider network, said means for producing timing pulses and said clock phase storage means and responsive to said output clock pulses, said timing pulses and said clock phase storage means for producing phase adjusted input clock pulses;

means for applying said phase adjusted input clock pulses to said local data storage device for clocking data in during the middle of the intervals of sampling pulses occurring within the other of said first and second half periods of said output clock pulses; and means operatively connected with and responsive to said clock phase storage means for disabling the production of input clock pulses during the one of said first and second half periods of said output clock pulses wherein the coincidence of a data transition with the interval of a sampling pulse was most recently detected.

* * * * *